Feb. 15, 1966    W. E. KOHMAN    3,234,797
SINGLE ROTOR GYRO STABILIZER
Filed March 8, 1963    3 Sheets-Sheet 1

INVENTOR.
WAYNE E. KOHMAN
BY
William V. Ebs
HIS ATTORNEY

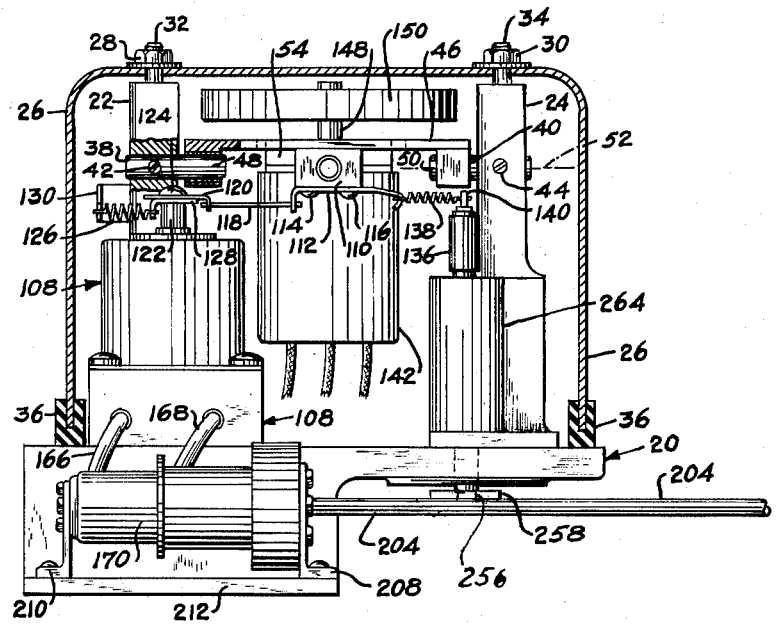

Feb. 15, 1966 W. E. KOHMAN 3,234,797
SINGLE ROTOR GYRO STABILIZER
Filed March 8, 1963 3 Sheets-Sheet 3
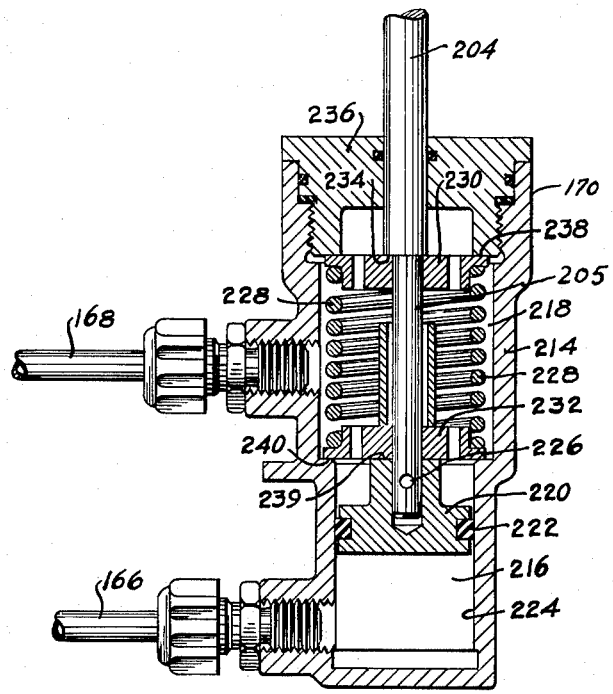
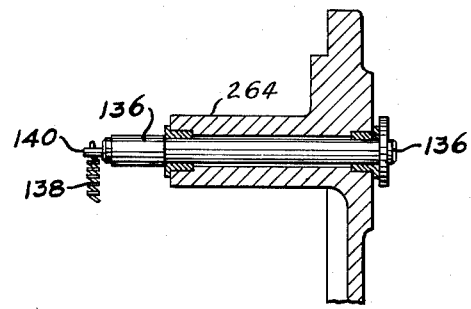
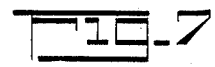
INVENTOR.
WAYNE E. KOHMAN
BY
*William V. Ebs*
HIS ATTORNEY ns by the set screws 42 and 44. Such

United States Patent Office 3,234,797
Patented Feb. 15, 1966

3,234,797
SINGLE ROTOR GYRO STABILIZER
Wayne E. Kohman, Morris Plains, N.J., assignor to Curtiss-Wright Corporation, a corporation of Delaware
Filed Mar. 8, 1963, Ser. No. 263,805
4 Claims. (Cl. 74—5.4)

My invention relates to apparatus for stabilizing aircraft, missiles, flying platforms, or other vehicles. In particular the invention is directed to a gyro stabilizing device for controlling vehicle stability about two axes.

Rate gyros are used in controlling the stability of flying objects; signals from the rate gyros proportional to the rate of tilt of the gimbal axes being used to operate control surfaces or other attitude controlling devices in such a manner that oscillations about control axes of the vehicle, as for example pitch and roll axes, are minimized. The common practice is to use a separate rate gyro for each control axis to detect angular velocity and control stability thereabout. The outputs of such rate gyros, however, fail to precisely represent angular velocity about the axes with respect to which they are supposed to control stability, due to the fact that each gyro becomes sensitive to angular velocity about a second axis as the gyro wheel tilts. The resulting error, which is known as cross-coupling error, is proportional to gimbal deflection.

It is an object of this invention to provide a single rotor gyro stabilizer which is capable of controlling vehicle stability about two axes and is substantially free of cross-coupling error.

It is another object of the invention to provide such a gyro stabilizer in which the gimbals are so restrained that only very slight displacement of a gimbal about its axis of rotation can occur in response to angular tilting of the unit about the quadrature axis.

Another object of the invention is to provide a gyro stabilizer capable of controlling the stability of a vehicle about two axes which is simpler in construction and lighter in weight than units presently known in the art.

It is a further object of the invention to provide a single rotor gyro stabilizer in which gimbal motion is so limited that the rotor drive is simplified and the durability thereof is increased.

It is still a further object of the invention to provide a gyro stabilizer for stabilizing a vehicle about two axes and requiring only one rotor which may be of substantial size to assure a high force level response to angular tilting of the vehicle.

Other objects and advantages of the invention will become apparent during a reading of the specification taken in connection with the drawings in which:

FIG. 3 is a side elevational view of the gyro stabilizer with the cover cut away to show the components of the device;

FIG. 4 is a vertical sectional view, diagrammatic in form, of one of the servo valves of the gyro stabilizer;

FIG. 5 is a vertical sectional view taken on the plane of the line 5—5 of FIG. 4;

FIG. 6 is a horizontal sectional view showing one of the hydraulic actuators of the stabilizer; and FIG. 7 is a vertical sectional view taken on the plane of the line 7—7 of FIG. 1.

Figure 1:
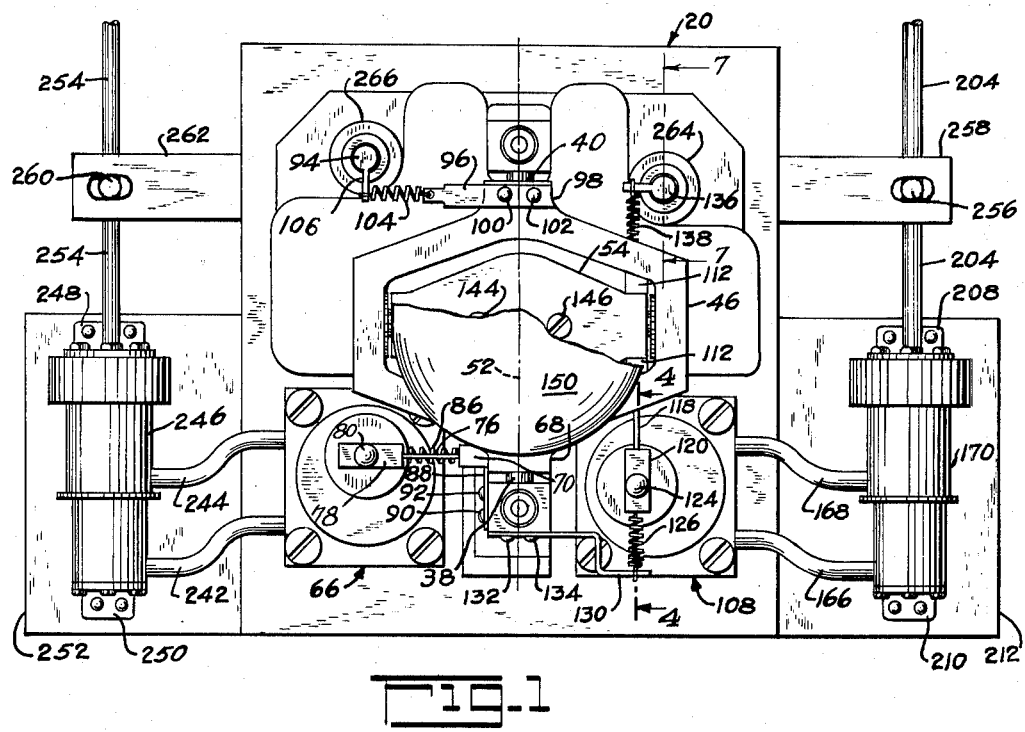
FIG. 1 is a top plan view showing the gyro stabilizer of the invention with the cover removed.

In the drawings, reference character 20 designates the base of the gyro stabilizer to which a pair of vertically extending posts 22 and 24 are affixed at their lower ends. The stabilizer is provided with a cover 26 which is securable at the other ends of the posts by nuts 28 and 30. The nuts, when tightened on threaded portions 32 and 34 of the posts, hold the cover tightly in position in seal 36 and the seal firmly against the surface of base 20. The posts 22 and 24 support stub shafts 38 and 40 respectively, which are held therein by the set screws 42 and 44. Such stub shafts 38 and 40 support an outer gyro gimbal 46 at 48 and 50 for rotation on an axis 52. The outer gimbal supports an inner gyro gimbal 54 on stub shafts 56 and 58 for rotation about an axis 60 which is at right angles to the axis 52, the stub shafts 56 and 58 being secured in the outer gimbal by the set screws 62 and 64.

The outer gimbal 46 mechanically connects with control valve 66 which is secured on base 20. As shown, the gimbal 46 includes the boss 68 to which a plate 70 is secured by rivets 72 and 74. Such plate attaches to one end of a wire 76 which has its other end affixed to a plate 78 that is secured by rivet 80 on the input element 82 of said servo valve 66. A bracket 84 also secured to input element 82 of servo valve 66 attaches to one end of a spring 86, the other end of the spring being affixed to a plate 88 that is secured by rivets 90 and 92 on post 22. The outer gimbal 46 not only connects with control valve 66 but also connects with a shaft 94. For the purpose of making the latter connection a plate 96 is secured to outer gimbal boss 98 as with rivets 100 and 102. The plate 96 attaches to one end of a spring 104 which has its other end attached to a bracket 106 that is integral with shaft 94. Springs 86 and 104 are preloaded equally in compression and tension respectively, to exert equal counteracting forces on the input element 82 of servo control valve 66.

The inner gimbal 54 connects with a servo valve 108, the boss 110 on inner gimbal 54 having a plate 112 secured to it by rivets 114 and 116, and the plate being connected to a wire 118 which is affixed to a plate 120 that is secured on input element 122 of the valve by rivet 124. A spring 126 attaches at one end to a plate 128 secured on valve input element 122 and at the other end to a plate 130 which is affixed by rivets 132 and 134 on post 22. The inner gimbal 54 connects with shaft 136 through spring 138 one end of which is secured to gimbal plate 112 and the other end of which is integral with the bracket 140 on shaft 136. Springs 126 and 138 are preloaded in tension to exert equal forces in opposite directions on the input element 122 of servo valve 108. A motor 142 is secured to inner gimbal 54 at 144 and 146. The motor shaft 148 extends through the inner gimbal, and has a gyro wheel 150 affixed thereon. Such wheel 150 is rotated at constant speed by motor 142 when the gyro stabilizer is in use.

The gyro stabilizer would ordinarily be affixed in a vehicle with each of the axes of rotation 52 and 60 of gyro gimbals 46 and 54 respectively coincident with a different one of two axes about which the vehicle is to be controlled. When the motor 142 is in operation and the gyro wheel 150 is being turned thereby, any tilt of the vehicle about the axis of one gimbal results in the other gimbal exerting an output torque proportional to the angular velocity of tilt. It is assumed that the gyro wheel 150 is turned clockwise (FIG. 1) by the motor. If then, the gyro stabilizer is tilted counterclockwise as viewed in FIG. 2 about the axis 52 of gimbal 46, the other gimbal 54 applies a force proportional to angular velocity of tilt toward the right as viewed in FIG. 3 through plate 112, wire 118 and plate 120 to input element 122 of the valve 108. When the gyro stabilizer tilts clockwise about axis 52 gimbal 54 exerts a force proportional to the angular velocity of tilt in opposition to the force which spring 138 exerts on the valve. A net force on input element 122 acting to the left and equal to the gimbal force results. If the gyro stabilizer is tilted clockwise as viewed from the right side of FIG. 2 about the axis 60 of gimbal 54, the other gimbal 46 acting through plate 70, wire 76 and plate 78 exerts a force acting to the right as viewed in FIG. 2 and proportional to the angular velocity of tilt on input element 82 of servo valve 66. When the gyro stabilizer tilts counterclockwise as viewed from the right side of FIG. 2 about the axis of gimbal 54, gimbal 46 exerts a force in opposition to the force exerted on the valve by spring 104. The result is a net force due to combined effect of the gimbal 54, spring 86 and spring 104 acting to the left as viewed in FIG. 2 on input element 82 and equal in magnitude to the gimbal force. The servo valves 108 and 66 operate according to the forces exerted on their input elements. In any practical application of the gyro stabilizer it is to be expected that the device will tilt simultaneously in some degree about both of the axes 52 and 60 rather than about only one such axis at a time so that in the usual case both servo valves would be actuated at the same time.

The internal construction of only one of the two servo valves of the gyro stabilizer, namely the valve 108, is shown in the drawings (FIGS. 4 and 5). The other valve 66 is generally similar in construction and a separate showing is therefore unnecessary. Referring to FIGS. 4 and 5 showing the valve 108, reference character 152 designates the valve housing which, as shown, includes cylindrical bore 154. Valve spool 156 located in bore 154 controls the flow of fluid through ports 158 and 160 which connect with fluid carrying conduits 162 and 164. The conduits 162 and 164 connect with lines 166 and 168 (FIG. 1) respectively that extend between the valve 108 and an actuator 170 which will be described in detail hereinafter. In the central position of the valve spool in bore 154 as shown in FIG. 4 the ports 158 and 160 are covered by lands 172 and 174 respectively. Whenever the valve spool is so located, there is no flow through the lines 162 and 164. Fluid is supplied to the valve 108 from a constant pressure source (not shown) to conduit 176 which connects through line 178 with cylindrical bore 154 between one end of spool 156 and land 172, that is at 180, and with bore 154 between the other end of the spool and land 174 at 182. Line 178 connects with the line 184 which in turn connects with flexible tubular member 186. The flexible tubular member connects with a rigid tube 188 having one end fixedly attached to the input element 122 of the valve. Tube 188 is pivotally supported by the flexible member 190 which seals one end of a chamber 192. Such tube 188 extends almost to the bottom of the chamber 192 into the vicinity of openings 194 and 196 which connect the chamber with lines 198 and 200 respectively.

In the absence of an input signal to servo valve 108 tube 188 occupies a position in which the axial line thereof is midway between the openings 194 and 196 at the bottom of chamber 192. When, however, the valve is actuated by an input signal which is applied as a resultant force (equal to gimbal force) to the input element 122, the tube 188 is caused to pivot at member 190 such that the tube is brought into closer alignment with either opening 194 or opening 196. Assuming a resultant force is applied to the valve tending to move input element 122 to the right, the lower end of the tube 188 moves toward alignment with opening 194 and away from alignment with opening 196 with the result that pressure is increased in line 198 as well as at the left end of the valve spool, whereas pressure is decreased in line 200 and at the right end of the valve spool. The valve spool 156 moves to the right, port 158 opens to connect pressure supply lines 176 and 178 with the lines 162 and 166, and port 182 opens connecting lines 164 and 168 with a pressure discharge line 202. The discharge line 202 communicates with a fluid reservoir (not shown) in which fluid is collected for return to the fluid pressure source. By reason of the difference in pressure created in this manner in lines 166 and 168 the actuator 170 is set into motion. When a resultant force acts on valve input element 122 to the left causing the lower end of the tube 188 to move to the right toward alignment with opening 196, pressure is increased in line 200 and at the right end of valve spool 156, whereas pressure is decreased in line 198 and at the left end of the valve spool. The valve spool moves toward the left connecting the pressure supply lines 176 and 178 through port 160 with lines 164 and 168 and lines 162 and 166 through port 158 with the discharge line 202, whereupon the actuator 170 is set into operation. Responses of the actuator are reflected in movements of its output member 204.

The valve spool 156 connects with tube 188 through a flat spring 206 which attaches at one end to the valve spool midway between the lands 172 and 174, and attaches at its other end to one end of a bracket 207, the other end of the bracket being affixed to the lower end of tube 188. Whenever the valve spool 156 moves from its central position in response to a force signal applied at element 122, the spring 206 acts to restore the tube 188 to a position with its axial line midway between openings 194 and 196 whereupon pressure in lines 198 and 200, as well as at opposite ends of the valve spool, become equal and motion of the spool ceases. Valve spool position and fluid flow rate in each of lines 166 and 168 is proportional to the magnitude of the signal applied to element 122. The valve should be carefully constructed to render it sensitive and fast acting such that the feedback of valve spool action to tube 188 through spring 206 limits displacement of the valve input element in response to an input signal to an almost imperceptible amount. It should be appreciated that the valve of FIGS. 4 and 6 is but one example of a suitable valve for the gyro stabilizer of the invention, and that differently constructed hydraulic servo valves may also be used, provided the valve is of a type which is force responsive and actuable without substantial movement of input elements.

As stated hereinbefore, the lines 166 and 168 extending from valve 108 connect with actuator 170. Such actuator is mounted on fixtures 208 and 210 which are secured to an extension 212 of the gyro stabilizer base 20. Referring to FIG. 6 it may be seen that the actuator includes housing 214 defining cylindrical chambers 216 and 218. Chamber 216 connects with line 166 and chamber 218 connects with line 168. A piston 220 in sealing engagement at 222 with housing inner wall 224 operates in chamber 216. As shown, the piston 220 is pinned to extension 205 of output member 204 at 226. When pressure is the same on both sides of piston 220, the piston is maintained in a central position within its operating range by a spring 228 which acts against slidably mounted collars 230 and 232. This is the position of the piston in FIG. 6. In this position of the piston, collar 230 bears against both the output member 204 at 234 and against the housing end closure member 236 at 238, and collar 232 bears against piston 220 at 239 and against housing 214 at 240. If pressure is increased in line 166 and chamber 216, and decreased in line 168 and chamber 218 by the operation of the valve 108, the actuator piston 220 is caused to move upwardly as viewed in FIG. 6, collar 232 being raised at the same time against the force of spring 228. If pressure is decreased in line 166 and chamber 216, and increased in line 168 and chamber 218 by the operation of the valve, the piston 220 is caused to move downwardly, the collar 230 being moved downwardly at the same time against spring 228. The output member 204 being fixedly connected to the piston 226 moves with it.

As mentioned hereinbefore, servo valve 66, which connects with gimbal 46, is like servo valve 108. The valve 66 connects through lines 242 and 244 with an actuator 246 which is mounted on fixtures 248 and 250 that are secured to an extension 252 of the gyro stabilizer base 20. Actuator 246 is constructed in the same fashion as actuator 170 and has a like function. Valve 66 controls actuator 246 in the same manner as valve 108 controls actuator 170. The actuator 246 includes output member 254 which corresponds to output member 204 of actuator 170.

Output member 204 of actuator 170 connects at 256 with a link 258 and output member 254 of actuator 246 connects at 260 with a link 262. The links 258 and 262 are affixed to shafts 136 and 94 respectively. The shafts 136 and 94 are rotatably mounted in posts 264 and 266 respectively, the posts being integral with base 20. As mentioned hereinbefore, shaft 136 attaches at bracket 140 to spring 138 and shaft 94 attaches at bracket 106 to spring 104.

Figure 2:
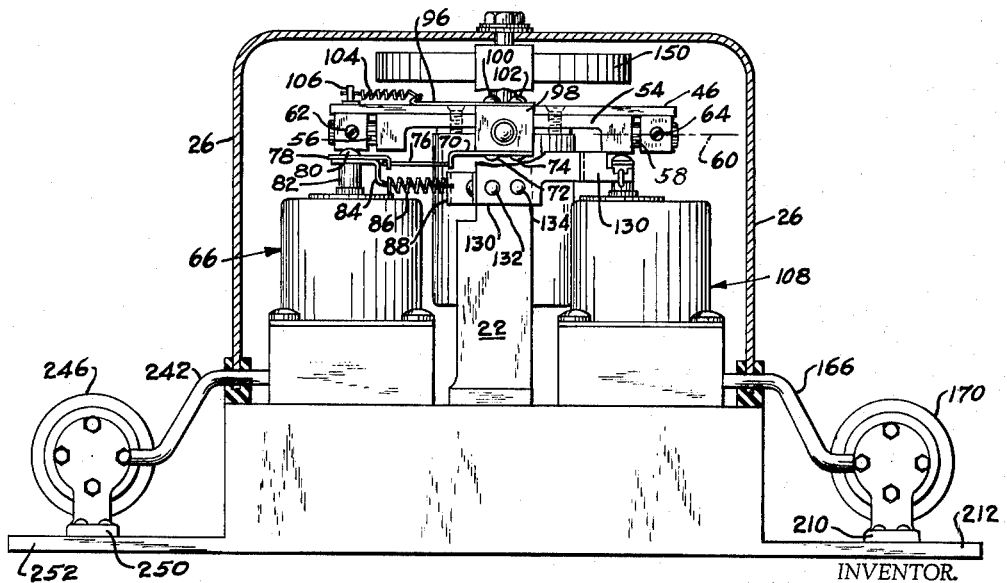
FIG. 2 is a front elevational view of the gyro stabilizer with the cover cut away to show the components.

Pressures in the lines 166 and 168 leading to actuator 170 are increased and decreased respectively in the manner already described when the gyro gimbal 54 applies a force to the right as viewed in FIG. 3 in response to a tilting of the gyro stabilizer to the left as viewed in FIG. 2. Output member 204 of actuator 170 moves upwardly (FIG. 1) and shaft 136 moves counterclockwise. Preload tension on spring 138 is thereby reduced until the force due to gimbal action on input element 122 of valve 108 is nulled. The valve spring 206 restores the valve spool 156 to its central position to close ports 158 and 160 and thereby equalize pressure on opposite sides of the piston 220 in actuator 170 whereupon motion of the actuator output member 204 ceases. Pressure in line 166 is decreased and pressure in line 168 increased to cause the output member 204 to move downwardly as viewed in FIG. 1 when the gyro gimbal 54 acts to exert a force opposite to the force of spring 138 in response to a tilting of the gyro stabilizer to the right as viewed in FIG. 2. Shaft 136 is moved clockwise (FIG. 1) by actuator output member 204 and tension in spring 138 is thereby increased. When the increase in tension in the spring 138 becomes equal to the magnitude of the force exerted by the gyro gimbal 54, motion of the actuator output member 204 ceases.

As noted hereinbefore, when the gyro stabilizer tilts clockwise as viewed from the right side of FIG. 2 about axis 60, gimbal 46 exerts a force acting to the right proportional to angular velocity on input element 82 of servo valve 66. The valve 66 responds by increasing pressure in line 242 and decreasing pressure in line 244, whereupon the output member 254 of actuator 246 moves upwardly as viewed in FIG. 1. Shaft 94 moves clockwise (FIG. 1) to increase the preload tension in spring 104. When tension in the spring 104 is increased in an amount equal to the force exerted by gyro gimbal 46, output member 254 ceases to move. When the gyro stabilizer tilts counterclockwise as viewed from the right side of FIG. 2 about axis 60, input element 82 is actuated by a resultant force acting to the left as viewed in FIG. 2 and equal to the force exerted by the gimbal 46. Such net force acting on input element 82 causes servo valve 66 to increase pressure in line 244 and decrease pressure in line 242. The output member 254 of actuator 246 moves downwardly (FIG. 1) causing shaft 94 to rotate counterclockwise. A force is thereby exerted on spring 104 in opposition to the force exerted by the gyro gimbal 46. When the force exerted by the gyro gimbal is balanced by the force due to the rotation of shaft 94, actuator output member 254 ceases to move.

As described, the actuator output members 204 and 254 move the shafts 136 and 94 respectively to balance gimbal forces which are proportional to angular velocity of tilt, that is, movements of the shafts result in forces being exerted on the servo valve input elements in opposition and equal to the forces due to gimbal action. Gimbal forces are eliminated as the stabilizer comes to the end of a tilting movement and as this occurs the opposing forces become effective to actuate the servo valves in such manner as to cause the actuator pistons to be returned to central positions. The actuator output members 204 and 254, along with shafts 136 and 94 to which they respectively connect, are returned to corresponding positions. The actuator output members reach positions proportional to angular velocity of tilt; that is, the actuator output member 204 assumes a position proportional to angular velocity of tilt of the gyro stabilizer about the axis of gimbal 54 and actuator member 254 assumes a position proportional to angular velocity of tilt of the gyro stabilizer about the axis of gimbal 46. The gyro stabilizer is rendered operable to damp tilting motions of a vehicle in which it is installed about the axes of gimbals 46 and 54 by connecting the actuator output members 204 and 254 with usitable control surfaces of the vehicle or other attitude control instrumentalities.

Referring to FIG. 3 it may be seen that the gimbal 54 is restrained from rotating counterclockwise by the plate 112, wire 118, and plate 120 connecting the gimbal to the substantially stationary input element 122 of servo valve 108. Clockwise rotation is prevented by preloading tension spring 138 with a force greater than the maximum force likely to be exerted in opposition to the force of the spring by the gimbal due to tilting of the gyro stabilizer so that the gimbal force cannot overcome the spring force to buckle wire 118. Spring 126 is preloaded in tension to the same extent as the spring 138, as has been mentioned hereinbefore. The gimbal 46 is restrained from rotating counterclockwise as viewed in FIG. 2 by plate 70, wire 76, and plate 78 connecting the gimbal to input element 82 of valve 66. Clockwise rotation of gimbal 46 is restrained by preloading tension spring 104 to prevent the maximum force likely to be exerted by the gimbal from overcoming the preload force on the spring to buckle wire 76. As noted hereinbefore spring 86 is preloaded in compression to the same extent that spring 104 is preloaded in tension. Due to the manner in which the gimbals are restrained they maintain substantially fixed positions in the gyro stabilizer at all times.

Although the gyro stabilizer is capable of controlling vehicle stability about two axes it has only the one gyro wheel 150. The use of but a single gyro wheel is rendered possible by reason of the restraint imposed on the gimbals. The gyro wheel which is rotatably mounted in one gimbal is thereby retained with its axis of rotation in a substantially fixed position in the device. The wheel cannot tilt about a gimbal axis in response to tilting motion of the gyro stabilizer. Gyro response due to tilting motion of the gyro stabilizer about one gimbal axis is therefore unaffected by tilting motion about the other axis. Also, cross-coupling error such as results in conventional rate gyros due to tilting of the gyro wheel by gimbal rotation in response to tilting of the gyro is avoided.

Although only one form of the invention has been shown and described it will be apparent to those skilled in the art that various changes and modifications may be made in the mechanism shown without departing from the spirit and scope of the invention. The gyro stabilizer of the invention might, for example, be provided with all mechanical components by using servo amplifiers which are force responsive and actuable without substantial movement of input elements in place of the hydraulic servo valves 66 and 108, and substituting mechanical elements for the actuators 170 and 246. The appended claims are intended to cover all such changes and modifications.

What I claim is:

1. A gyro stabilizer comprising a base; structure affixed to the base; an outer gimbal rotatably mounted in said structure; an inner gimbal rotatably mounted in the outer gimbal; a gyro wheel rotatably mounted on the inner gimbal, the axes of rotation of the inner and outer gimbals being mutually perpendicular, and the axes of rotation of the inner gimbal and said wheel being mutually perpendicular; a first servo amplifier controllable according to outer output gimbal torque, said first servo amplifier including an input element and means for restricting displacement of said element; a mechanical connection from said outer gimbal to the input element of said first servo amplifier; a first actuator operably connected to said first servo amplifier and controllable thereby; a mechanical feedback connection from the first actuator to the outer gimbal including a resilient member preloaded to exert a force on the outer gimbal and input element of said first servo amplifier in one direction; another resilient member fixed at one end with respect to the base and having the other end connected with said input element of the first servo amplifier, said another resilient member being preloaded to exert a force on the outer gimbal and input element of the first servo amplifier opposite and equal to the force exerted by the resilient member in the feedback connection to the outer gimbal; a second servo amplifier controllable according to inner gimbal output torque, said second servo amplifier including an input element and means for restricting displacement thereof; a mechanical connection from said inner gimbal to the input element of the second servo amplifier; a second actuator operably connected to said second servo amplifier and controllable thereby; a mechanical feedback connection from the second actuator to the inner gimbal including a resilient member preloaded to exert a force on the inner gimbal and input element of the second servo amplifier in one direction; a counteracting resilient member fixed at one end with respect to the base and having the other end connected with said input element of the second servo amplifier, said counteracting resilient member being preloaded to exert a force on the inner gimbal and input element of the second servo amplifier opposite and equal to the force exerted by the resilient member in the feedback connection to the inner gimbal.

2. A gyro stabilizer as defined in claim 1 wherein the mechanical connection from the outer gimbal to the input element of the first servo amplifier includes a wire maintained in tension by the resilient member in the feedback connection to the outer gimbal, and said another resilient member; and the mechanical connection from the inner gimbal to the input element of the second servo amplifier includes a wire maintained in tension by the resilient member in the feedback connection to the inner gimbal, and said counteracting resilient member.

3. A gyro stabilizer as defined in claim 1 wherein the resilient members which connect with the outer gimbal are preloaded in an opposite sense to the resilient members which connect with the inner gimbal.

4. A gyro stabilizer comprising a base; structure affixed to the base; a gimbal rotatably mounted in said structure; a gyro wheel supported by said gimbal and rotatable on an axis perpendicular to the axis of said gimbal; a servo amplifier controllable according to gimbal torque, said servo amplifier including an input element and means for restricting displacement of said element; a mechanical connection from said gimbal to the input element of said servo amplifier; an actuator operably connected to the servo amplifier and controllable thereby; a mechanical feedback connection from the actuator to the gimbal including a resilient member preloaded to exert a force on the gimbal and input element of the servo amplifier in one direction; another resilient member fixed at one end with respect to the base and having the other end connected with said input element of the servo amplifier, said other resilient means being preloaded to exert a force on the gimbal and input element of the servo amplifier opposite and equal to the force exerted by the resilient member in said feedback connection.

References Cited by the Examiner
UNITED STATES PATENTS 2,610,509  9/1952  Barnes _____ 74—5.4
3,124,007  3/1964  Swinney _____ 74—5.22

MILTON KAUFMAN, *Primary Examiner.*

BROUGHTON G. DURHAM, *Examiner.*